United States Patent Office 3,630,997
Patented Dec. 28, 1971

3,630,997
CURABLE EPOXY RESIN COMPOSITIONS AND
METHOD OF PREPARING SAME
Paul M. Craven, Tokyo, Japan, assignor to The Dow
Chemical Company, Midland, Mich.
No Drawing. Continuation-in-part of application Ser. No.
599,741, Dec. 7, 1966. This application May 4, 1970,
Ser. No. 34,523
Int. Cl. C08g 33/10
U.S. Cl. 260—47 EC   6 Claims

ABSTRACT OF THE DISCLOSURE

This invention relates to novel epoxy resin compositions and to cured products obtained therefrom. More particularly, it relates to curable epoxy resin compositions containing an epoxy resin having a plurality of 1,2 epoxide units, from about 25 to 200 parts per 100 parts of epoxy resin of a thioalkyl substituted diphenyl oxide curing agent and from about 0.05 to 15 parts per 100 parts of epoxy resin of the accelerator tetramethyl guanidine.

This application is a continuation-in-part of copending application Ser. No. 599,741 filed Dec. 7, 1966, now abandoned.

The properties of epoxy resins can often be widely varied by incorporation of various reactive diluents, plasticizers, fillers and the like, or by admixture with other resins. However, the resultant compositions are complex, multi-component systems having properties which frequently constitute a less than ideal compromise for the application contemplated. It would thus be advantageous to provide an epoxy resin system comprising only two or three principal ingredients wherein the proportions of the system are desirably variable over a wide range simply by adjusting the relative properties of such ingredients.

Further, in those cases where epoxy resins are nearly ideally suited for an intended use, they are frequently limited by certain practical considerations. For example, some resins cure rapidly and smoothly at room temperature but cure very slowly or not at all at freezing temperatures or cure violently at elevated temperatures. Still further, resins capable of a rapid and smooth cure in small mass often fail to cure in thin section or cure violently in large mass. In cases where a rapid cure is required to reduce set time, or to achieve an underwater cure, it is frequently found that a heat-generating diluent, such as a phenol modifier for an amine cure, detracts from the final properties; an acid modified aromatic amine cure is deficient as compared with a thermally induced aromatic amine cure; and most Lewis acid curing agents are uncontrollably exothermic and thereby initiate the reaction before proper mixing is achieved.

According to the present invention, epoxy resin systems having a wide range of desirable properties are prepared by the combination of epoxy resins with diphenyl oxides substituted with an average of from about 2.1 to 2.5 thioalkyl radicals and where the alkyl constituent contains from 1 to about 4 carbon atoms. In this regard, it has been found that such epoxy resin compositions comprising at least equimolar properties of a diphenyl oxide substituted with an average of between about 2.1 and 2.5 thioalkyl groups can be cured by heat alone, and, in addition, form highly desirable foamed materials.

In a particularly useful embodiment of this invention, it has been found that the addition of the accelerator tetramethyl guanidine to the contemplated epoxy resin-thioalkyl diphenyl oxide systems provides a composition which can be mixed for at least one minute without gelling or setting but which will thereafter gel or set to a substantially solid state in a period of time ranging from a few seconds to several minutes. Such compositions generate exotherms within one to three minutes after initiation of mixing which, regardless of how the resin mass is actually distributed, are generally equivalent to peak exotherm of from about 195° F. to 285° F. at the center of a 20 gram spherical resin mass. These compositions can readily be mixed at temperatures as low as about 14° F.

More specifically, according to this invention, epoxy resins which are capable of being rapidly cured in thin section or relatively large mass over a wide range of temperatures without undesirable frothing, localized gel formation, striations from viscosity and density gradients, and non-uniform coloration from excessive exothermic heat of reaction are prepared by addition to the epoxy resin, prior to curing thereof, of (1) from about 25 to 200 parts per 100 parts of epoxy resin (phr.) of a thioalkyl diphenyl oxide of the formula:

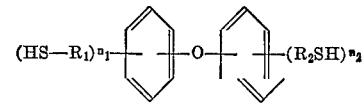

where $R_1$ and $R_2$ are alkylene groups having from 1 to 4 carbon atoms and $n_1$ and $n_2$ are integers from 0 to 2 where the sum of $n_1$ and $n_2$ does not exceed about 2.5 and wherein such sum is preferably from about 2.1 to 2.5, and (2) from about 0.05 to 15 parts, preferably 0.15 to 8 parts per 100 parts of epoxy resin of the accelerator tetramethyl guanidine.

In a further embodiment of the present invention, it has been discovered that the epoxy resins described herein (when combined with conventional foaming agents, e.g. highly volatile liquids) form unexpectedly tough, resilient, uniformly foamed products characterized by a rapid expansion and setting without undesirable charring.

Exemplary of the epoxy resins which may be employed with the curing agents as specifically described herein are those resins represented by the formulae:

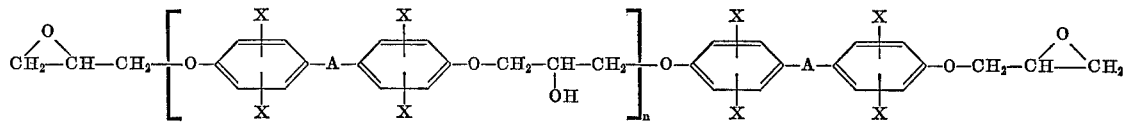

wherein A is selected from the group comprising —CH$_2$—,

X is a hydrogen or a halogen and $n$ is an integer having an average value of from about 0 to about 2.5

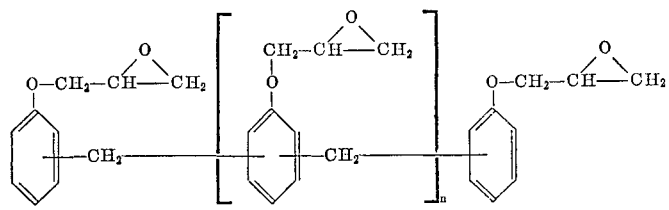

wherein $n$ is an integer from 0 to about 1.6.

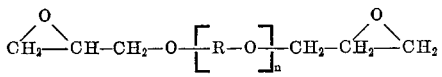

wherein R is an alkylene group such as ethylene, propylene, butylene etc., and $n$ is an integer from about 3 to about 40, and

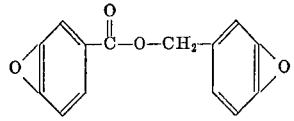

wherein such formula is illustrative of an epoxidized aromatic carboxylate resin.

Exemplary of the thioalkyl diphenyl oxides useful in this invention are any of those compounds contemplated by the general formula

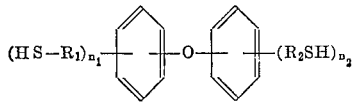

where $R_1$ and $R_2$ are alkylene groups containing from 1 to about 4 carbon atoms, and $n_1$ and $n_2$ are integers from 0 to 2 with their sum not exceeding about 2.5 and wherein such sum is preferably from about 2.1 to 2.5. A particularly preferred thioalkyl diphenyl oxide is thiomethyl diphenyl oxide having an average of about 2.1 thiomethyl groups.

The epoxy resin and curing agents are combined by simply admixing the required ingredients together at the desired temperature. Additional materials, such as fillers; pigments; fibers; dyes; plasticizers; peroxides; such as benzoyl peroxide; accelerators, such as triphenyl phosphite; blowing agents and the like can also be incorporated in the curable epoxy resins if desired.

Methods of preparing the compositions of the present invention and illustration of desirable and unexpected utility thereof are illustrated in the following examples.

EXAMPLE 1

In each of a series of experiments, varying amounts of one or more epoxy resins were weighed into small polyethylene vials. Thereafter, a curing agent and accelerator was added with simultaneous manual mixing. Zero time was established by starting a stop-watch at the instant when the critical ingredient or mixture of ingredients was added. Mixing was continued through the time when heat is felt through the vial (which time is recorded as initial exotherm) and continued until viscosity increase is too great, the system sets or gels, or the vial becomes too hot to hold. Set or gel time was recorded on the basis of visual observations well known to those skilled in the art, and the maximum exotherm time was recorded as the time when the polyethylene melts, which closely follows the time when the vial becomes impossible to hold. The true peak exothermic temperature is usually well in excess of the melt temperature of the insulating wall of the polyethylene vial.

The following Table I illustrates the epoxy resins used; the curing agent and accelerator used; the time required for the first evidence of exotherm; the time required for maximum exotherm and the appearance of the cured resins.

TABLE I

|  | Run Number | | | | | |
|---|---|---|---|---|---|---|
|  | 1 | 2 | 3 | 4 | 5 | 6 |
| (1) Epoxy resin DEN 438, g. | 14 | 14 | 14 | 14 | 14 | 14 |
| (2) Epoxy resin DER 736, g. | 7 | 7 | 7 |  |  |  |
| (3) Epoxy resin RD-2, g. |  |  |  | 7 | 7 | 7 |
| (4) Thiomethyldiphenyl oxide, g. |  | 7 | 7 | 7 | 7 |  |
| Choline (50% aqueous soln.), g. | 1 | 1 |  |  |  |  |
| Tetramethylguanidine, drops |  |  | 10 | 3 | 10 | 20 |
| Seconds to initial exotherm | (¹) | 30 | 10 | 30 | 20 | 15 |
| Seconds to maximum exotherm |  | 50 |  | 180 | 150 | 90 |
| Seconds to gel |  |  | 50 |  |  |  |
| Appearance of cured resin | (²) | Smooth | Smooth | Smooth | Smooth | Smooth |

¹ No reaction.
² Bubbles.

(1) Epoxy resin having the formula

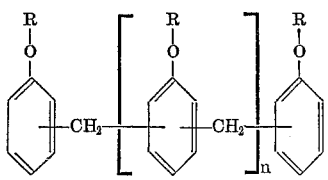

where $n=1.6$ and R is

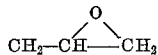

(2) Reaction product of (1) polypropylene glycol initiated from monopropylene glycol and propylene oxide to a molecular weight of 250 and (2) epichlorohydrin, to form an epoxy resin having an equivalent weight of 190

(3) Butanediol diepoxide

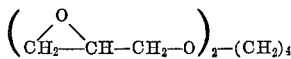

(4)

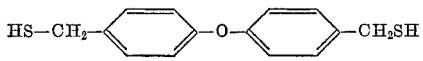

including enough of more highly substituted species to give an average thiomethyl functionality of about 2.1 formed by the reaction of chloromethylated diphenyl oxide in the presence of a 20 percent molar excess of sodium hydrosulfide in an ethanol solvent while utilizing a reaction temperature of between about 35 and 40° C. and wherein the thiomethyl functionality (SH) is the average number of thiomethyl groups per diphenyl oxide nucleus.

EXAMPLE 2

In like manner as in Example 1, 5 drops of tetramethyl guanidine were added to a mixture comprising 14 grams of epoxy resin DEN 438, 7 grams of epoxy resin DER 736 and 7 grams of the thiomethyldiphenyl oxide of Example 1, but wherein the mixture of epoxy resins and curing agent had been cooled to a temperature of —10° C. The mixture was then stirred slowly while maintaining the temperature at —10° C. and in 7 minutes cured to a tough, smooth, essentially bubble-free, essentially colorless composition.

EXAMPLE 3

In like manner as in Example 2, 5 drops of tetramethyl guanidine were added to a mixture comprising 14 grams of epoxy resin DEN 438, 7 grams of epoxy resin DER 736 and 7 grams of the thiomethylphenyl oxide of Example 1, but wherein such mixture was maintained at a temperature of 100° C. The mixture was then stirred slowly while maintaining the temperature at 100° C. and in 20 seconds had cured to a tough, smooth, bubble-free, essentially colorless composition.

Similar good results as specifically set forth herein are obtained when curing epoxy resins using the type and amounts of thioalkyldiphenyl oxides and alkylated guanidines prescribed herein. Such modified epoxy resins may be smoothly cured into thin section or relatively large mass over a wide range of temperatures without undesirable frothing, discoloration or excessive exotherm. As such, these modified epoxy resins may be used as coatings applied under water, as adhesives whose components are machine mixed where application is required under conditions of inclement weather and as highly filled systems which can be used as fillers or sealing compounds that are used in fast-moving process lines requiring, for example, rapid sanding capability and extremely fast binding capability. Further, such modified epoxy resins may be advantageously used as film type adhesives, castings, coatings, and laminates as well as for use in preparing reinforced plastics, coatings, potting compounds, and the like.

EXAMPLE 4

In like manner as in Example 1, except that the mixtures were stirred with a hollow glass rod in which a thermocouple was inserted, the effects of variations in the amounts of tetramethyl guanidine employed were demonstrated. DER 332 epoxy resin (the diglycidyl ether of bisphenol A having an epoxide equivalent weight of about 174) was used in each of two runs.

In the runs diphenyl oxide substituted with an average of 2.1 thiomethyl groups per molecule was employed in the amount of 5 grams per 15 grams of DER 332 and two different amounts (11 drops and 20 drops) of tetramethyl guanidine (TMG) were added.

The results given in Table II were obtained by stirring the mixture for two minutes and then letting the reaction proceed without further mixing but with the thermocouple inserted in the center of the mass.

TABLE II

| Properties | Sample identification | |
|---|---|---|
| | A | B |
| Thiomethyl functionality | 2.1 | 2. |
| Drops TMG | 11 | 20 |
| Average heat-up rate, °/sec | 0.48 | 0.88 |
| Time to thicken (seconds) | 1,200 | 257 |
| Time to gel (seconds) | 2,580 | 600 |
| Time to solidify (seconds) | 7,200 | 2,024 |
| Color cured resin | Good | Good |
| Peak exo. temp., °F | 195 | 212 |
| Time to reach peak recorded | 134 | 85 |

EXAMPLE 5

In the manner of Example 4, a sample (C) was made with 15 grams of DER 332 resin, 5 grams of a 7 to 3 by weight blend of diphenyl oxides substituted with an average of 2.1 and 3 thiomethyl groups per molecule respectively and 20 drops of tetramethyl guanidine.

Similarly, a sample (D) was made with 15 grams of a 15 to 85 percent by weight blend of DEN 438 and DER 332 epoxy resins, 5 grams of diphenyl oxide substituted with an average of 2.1 thiomethyl groups per molecule and 20 drops of tetramethyl guanidine.

The results for runs C and D are as follows:

TABLE III

| | Sample C | Sample D |
|---|---|---|
| Heat-up rate | 0.92 deg./second | 0.54 deg./second. |
| Time to thicken | 85 seconds | 221 seconds. |
| Time to gel | 275 seconds | 410 seconds. |
| Time to solidify | 360 seconds | 874 seconds. |
| Color | Uniform brown | Uniform brown. |
| Quality | | Good, tough, and resilient |
| Peak exotherm temperature | 266° F | 230° F. |
| Time to peak | 114 seconds | 84 seconds. |

It will be seen that the composition of sample C cured spontaneously within a total time of six minutes to a tough, resilient, uniformly colored resin without exceeding a temperature of 266° F. The composition of sample D was slower curing but gave a good resin with a faster exotherm which was substantially cured after 7 minutes. These experiments demonstrate control of cure and properties varying the functionality of either the thiomethyl or the epoxide constituent.

EXAMPLE 6

In the manner of Example 4, 15 grams of an epoxy resin of the following general structure

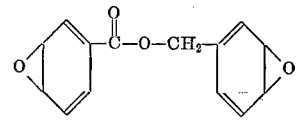

was mixed with between 5 and 5.5 grams of thiomethyl diphenyl oxide (functionability 2.1) and 20 drops of tetramethyl guanidine. This material is identified as sample E.

TABLE IV

| | Sample E |
|---|---|
| Heat-up rate | .07°/sec. |
| Time to thicken | 1240 sec. |
| Time to gel | Did not gel within 24 hrs. |
| Time to solidify. | |
| Color. | |
| Quality. | |
| Peak, exo. temp., °F. | 130. |
| Time to peak | 1505 sec. |
| Equiv. ratio oxirane to thiomethyl | 2.2 to 2.6. |

It will be seen that this type of resin does not cure as rapidly at room temperature as the epoxy resins of the previous examples, and that high functionability and application of heat would be preferred to assure adequate cure.

EXAMPLE 7

In the manner of Example 4, a run (sample F) was made with 15 grams of DER 732 resin, 20 drops of tetramethyl guanidine, and 5 grams of diphenyl oxide substituted with an average of 2.1 thiomethyl groups per molecule. The oxirane to thiomethyl equivalent ratio was 1.1 for this run.

TABLE V

| | Sample F |
|---|---|
| Heat-up rate | 0.12°/sec. |
| Time to thicken | Remained fluid. |
| Time to gel | Do. |
| Time to solidify | Do. |
| Color | Do. |
| Quality | Good prepolymer. |
| Exo. peak temp. °F. | 167. |
| Time of peak | 510 sec. |

The material designated as sample F is especially suitable as prepolymer for further cure from consideration of viscosity and the ability to impart flexibility to an epoxy resin composition.

EXAMPLE 8

The following experiments were run to establish the nature and curing proportion of epoxy resin compositions containing varying amounts of thiomethyl-diphenyl oxide (TMDPO). The compositions employed are identified as follows:

| Sample identification | DER 332 (parts by weight) | TMDPO (thiomethyl functionality of about 2 1) |
|---|---|---|
| G | 75 | 25 |
| H | 45 | 55 |

The above mixtures were admixed and poured into aluminum dishes. The following Table VI illustrates the effect of exposure of the samples to varying temperature conditions.

TABLE VI

| Temperature conditions | Sample identification | |
|---|---|---|
| | G | H |
| 3 hours at room temperature (77° F.) | Thickened (no gel). | Thickened (no gel). |
| 22 hours at room temperature (77° F.) | Stiff. | Solid. |
| 1 hour, 40 minutes at 195° F | Viscous. | Viscous. |
| 1 hour, 40 minutes at 195° F. plus 4 hours, 20 minutes at 77° F | Soft, flexible. | Tough, hard. |
| 1 hour, 40 minutes at 195° F. plus 4 hours, 20 minutes at 255° F | Soft, flexible. | Soft, flexible. |

EXAMPLE 9

The following formulations were prepared to demonstrate the foaming capabilities of the epoxy resin compositions contempated by the present invention. All amounts are given in grams unless otherwise indicated.

| Ingredients | Formulation identification | |
|---|---|---|
| | I, For comparison | J, The invention |
| DER 331 (diglycidyl ether of bisphenol A) | 10 | 10 |
| TMDPO 30 [1] | 3.5 | 2.75 |
| TMDPO 21 [2] | | 2.75 |
| Tetramethylammonium hydroxide (50% soln. in methanol), drops | 5 | |
| Tetramethyl guanidine (TMG), drops | | 5 |
| Methanol, drops | 10 | 10 |

[1] Thiomethyldiphenyl oxide having a thiomethyl functionality of about 3.
[2] Thiomethyldiphenyl oxide having a thiomethyl functionality of about 2.1.

In each instance, the formulation ingredients were hand mixed in paper cups for 15 seconds. The following Table VII illustrates the foaming characteristics observed.

TABLE VII

| | Sample identification | |
|---|---|---|
| | I, For comparison | J, The invention |
| Foaming time (sec) | 35 | 52. |
| Volume (times original non-foamed volume) | 2 | 4. |
| Cell size | Large | Medium. |
| Color | Brown | Off white. |
| Comments | Brittle | Flexible. tough. |

The above data illustrate that the compositions of the present invention (represented by Formulation J) may be easily foamed, using conventional foaming agents, into materials having desirable color, flexibility, toughness and structure without undesirable charring; whereas otherwise equivalent compositions prepared from formulations containing a thioalkyl functionality of greater than about 2.5 and absent the accelerator tetramethyl guanidine (represented by Formulation I) produce foam materials having significantly inferior properties.

What is claimed is:

1. A curable resin composition comprising (1) an epoxy resin having a plurality of 1,2 epoxy units, (2) from about 25 to 200 parts per 100 parts of said epoxy resin of a thioalkyl diphenyl oxide of the formula

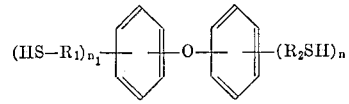

where $R_1$ and $R_2$ are alkylene having from 1 to 4 carbon atoms and $n_1$ and $n_2$ are integers from 0 to 2 wherein the sum of said integers does not exceed about 2.5, and (3) from about 0.05 to 15 parts per 100 parts of said epoxy resin of tetramethyl guanidine.

2. The composition of claim 1 wherein said thioalkyl diphenyl oxide is thiomethyl diphenyl oxide.

3. The composition of claim 2 wherein said thiomethyl diphenyl oxide has an average of from about 2.1 to 2.5 thiomethyl groups.

4. A method for preparing an epoxy resin composition which can be cured rapidly to a thermoset resin comprising adding to an epoxy resin having a plurality of 1,2 epoxy units, prior to curing said resin to a thermoset condition, of (1) from about 25 to 200 parts per 100 parts of said epoxy resin of a thioalkyl diphenyl oxide of the formula:

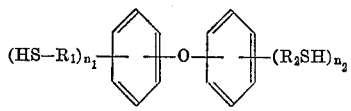

where $R_1$ and $R_2$ are alkylene having from 1 to 4 carbon atoms and where $n_1$ and $n_2$ are integers from 0 to 2 wherein the sum of said integers does not exceed about 2.5, and (2) from about 0.5 and 15 parts per 100 parts of said epoxy resin of tetramethyl guanidine.

5. The method of claim 4 wherein said thioalkyl diphenyl oxide is thiomethyl diphenyl oxide.

6. The method of claim 5 wherein said thiomethyl diphenyl oxide has an average of from about 2.1 to 2.5 thiomethyl groups.

References Cited

UNITED STATES PATENTS 3,051,665  8/1962  Wismer et al. _____ 260—2.5
3,355,512  11/1967  De Acetis et al. _____ 260—830

MURRAY TILLMAN, Primary Examiner
M. FOELAK, Assistant Examiner

U.S. Cl. X.R.

260—2 EC, 2.5 EP, 49, 79